(12) United States Patent
Takahashi et al.

(10) Patent No.: US 6,213,292 B1
(45) Date of Patent: Apr. 10, 2001

(54) MOLDED CONVEYOR CHAIN (75) Inventors: Toshio Takahashi; Katsutoshi Shibayama; Yoshihiro Murakami; Takashi Ishii, all of Osaka-fu (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/321,650

(22) Filed: May 28, 1999

(30) Foreign Application Priority Data

May 29, 1998 (JP) .................................. 10-149439

(51) Int. Cl.$^7$ .................................. B65G 17/38
(52) U.S. Cl. .................................. 198/853; 198/851
(58) Field of Search .................................. 198/853, 851

(56) References Cited

U.S. PATENT DOCUMENTS

| 3,742,863 | * | 7/1973 | Rosenberger, Jr. | 104/172.2 |
| 3,910,406 | * | 10/1975 | Pulver et al. | 198/833 |
| 4,153,152 | * | 5/1979 | Lapeyre | 198/851 |
| 4,682,687 | * | 7/1987 | Leege et al. | 198/852 |
| 4,911,681 | * | 3/1990 | Funkhouser | 474/145 |
| 5,092,118 | * | 3/1992 | VanDeMark | 59/84 |
| 5,305,872 | * | 4/1994 | Hutton | 198/853 |
| 5,431,275 | * | 7/1995 | Faulkner | 198/853 |
| 5,547,071 | * | 8/1996 | Palmaer et al. | 198/853 |
| 5,566,817 | * | 10/1996 | Meeker | 198/848 |
| 5,586,644 | * | 12/1996 | Coen et al. | 198/853 |
| 5,597,260 | * | 1/1997 | Peterson | 403/319 |
| 5,662,211 | * | 9/1997 | Quentin | 198/853 |
| 5,728,023 | * | 3/1998 | Green et al. | 474/206 |
| 5,960,937 | * | 10/1999 | Stebnicki et al. | 198/851 |

FOREIGN PATENT DOCUMENTS

304381 * 1/1929 (GB) .

* cited by examiner

*Primary Examiner*—Joseph E. Valenza
*Assistant Examiner*—Rashmi Sharma
(74) *Attorney, Agent, or Firm*—Dann, Dorfman, Herrell and Skillman; Henry H. Skillman (57) ABSTRACT

A number of link plates molded of synthetic resin are pivotally connected together by connecting pins to form a molded conveyor particularly suitable for the conveyance of delicate or easy-to-break articles. Each link plate has a plurality of aligned bush holes formed at intervals along a trailing end edge of the link plate, and a plurality of aligned pin holes formed at intervals along a leading end edge of the link plate. Each of the connecting pins is inserted alternately into the pin holes in one link plate and the bush holes in the adjacent link plate to pivotally connect these two link plates. A locking projection formed on the connecting pin to lock the connecting pin in position against detachment is located closer to one end of said connecting pin than to a longitudinal central portion of said connecting pin. The locking projection thus arranged reduces a stroke of hammering required to drive the connecting pin into the pin and bush holes. The connecting pin further has a flange-like stopper serving to position the locking projection within one of the bush holes when the connecting pin is in its fully inserted position.

11 Claims, 8 Drawing Sheets

MOLDED CONVEYOR CHAIN

BACKGROUND OF THE INVENTION

1. Field of the Invention

This invention relates to a molded conveyor chain having number of link plates of synthetic resin pivotally connected together by connecting pine and driven by sprockets for conveyance of delicate or easy-to-break articles in the electric, electronic, food-processing or pharmaceutical industry.

2. Prior Art

Figure 11:
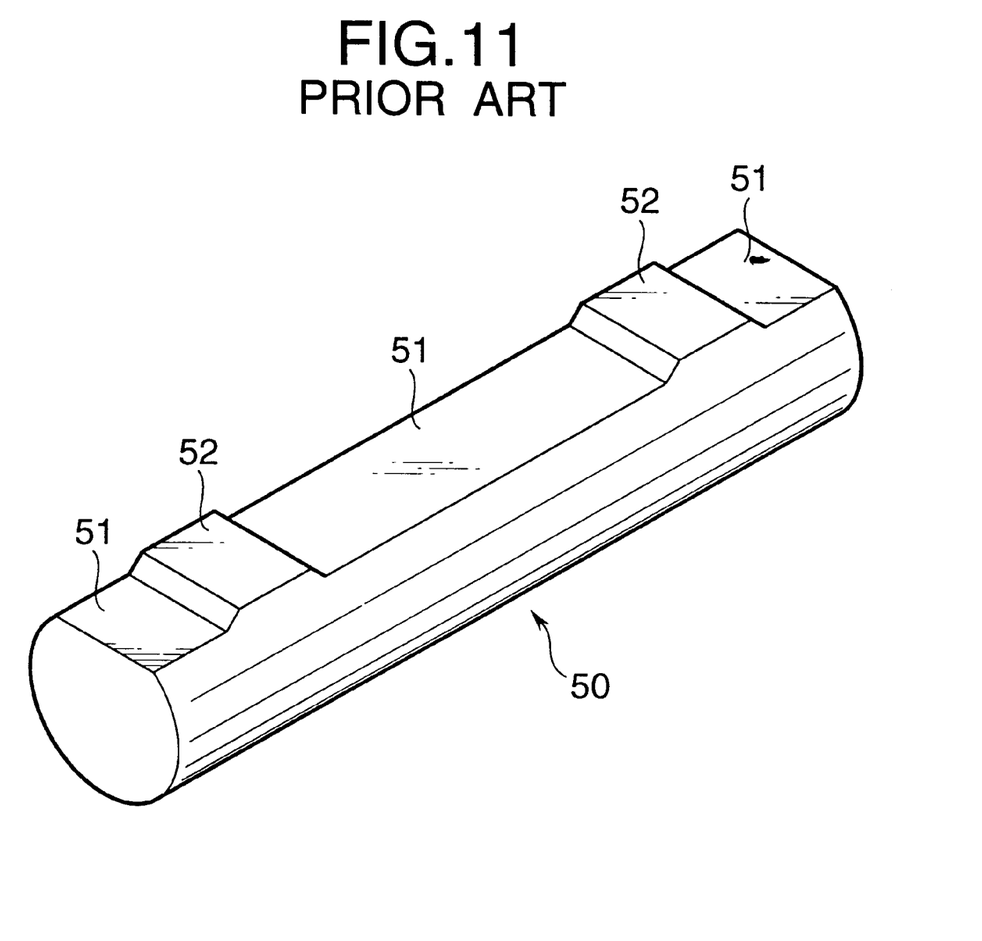
FIG. 11 is a perspective view showing a connecting pin of a conventional conveyor chain.
Figure 12:
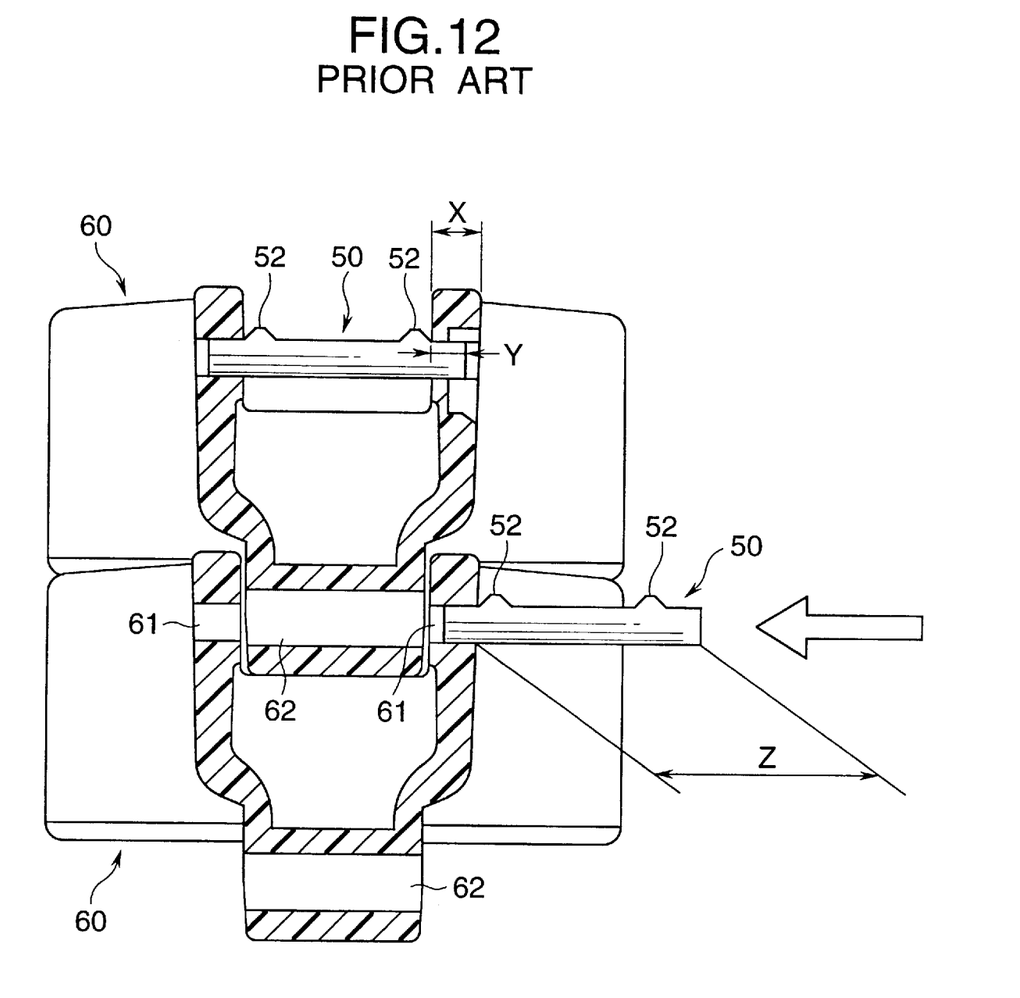
FIG. 12 is a cross-sectional view showing the manner in which two adjacent link plates of the conventional conveyor chain are about to be connected together by the connecting

Various molded conveyor chains having a number of link plates of synthetic resin connected together by connecting pins are known. As shown in FIG. 11, the connecting pins of the conventional molded conveyor chains have a flat portion 51 on its circumferential surface, and two projections 52, 52 formed on the flat portion 51 at positions equidistant from the center of the connecting pin 50. Tn the assembled Plate of the conveyor chain as shown in FIG. 12, a barrel end of one link plate 60 and an open end of the adjacent link plate 60 are pivotally connected by one of the connecting pins 50. Each of the projections 52, 52 of the connecting pin 50 has an outer edge engaged with an inner surface of one of two hinges at the open end of the link plate 60, and opposite end portions of the connecting pin 50 are located inside two aligned pin holes 61, 61 of the hinges of the link plate 60. The connecting pin 50 is received in a bush hole 62 formed in a hinge at the barrel end of the link plate 60 with a clearance therebetween. Sliding engagement between the circumferential surface of the connecting pin 50 and the bush hole 62 in the link plate 60 enables the conveyor chain to bend or flex about the axis of the connecting pin 50.

The illustrated conventional molded conveyor chain has various drawbacks as enumerated below.

(1) The opposite end portions of the connecting pin 50 have a length Y set to be smaller than the width X of each hinge of the link plate 60, as shown in FIG. 12. Accordingly, when the operator attempts to insert the connecting pin 50 alternately into the pin holes 61 and the bush hole 62 to pivotally connect two adjacent link plates 60, 60, the forward movement of the connecting pin 50 is arrested when a loading one of the projections 52 comes into engagement with an outer surface of one of the hinges of one link plate 60. To cope with this problem, the operator is forced to hammer the trailing end of the connecting pin 50 while gripping the two link plates in such a manner as to maintain accurate alignment between the pin holes and the bush hole. Such link-plate joining operation is tedious and time consuming and exerts a great load on the operator. Furthermore, when the two link plates 60 are to be detached, the connecting pin 50 is axially driven with a hammer until two projections 52 move past the pin hole 61 which is located at the open end of the link plate 50. This means that a stroke Z of hammering the connecting pin 50 to remove the connecting pin 50 from the two adjacent link plates 60, 60 is substantially equal to the length of the connecting pin 50. Such a large hammering stroke considerably lowers the efficiency of the link-plate detaching. A conveyor chain disassembling work also encounter with the same problem because this work involves the connecting pin detaching operation.

(2) In the case where the conveyor chain is automatically assembled on a special automatic assembling machine, the positions of the projections 52, 52 on each connecting pin 50 are precisely controlled in such a manner that the projections 52 are in engagement with the opposed inner surfaces of two hinges of each link plate 60. It may occur, however, that when opposite ends of the conveyor chain are manually joined together to set the conveyor chain on a conveyor frame, the connecting pin 50 is driven either excessively or insufficiently. In this instance, one of the projections 52 of the connecting pin 50 is caught or arrested within a corresponding one of the pin holes 61 of the link plate 60. Due to a stress exerted from the projection 52 to the peripheral wall of the pin hole 61, the hinge having the thus stressed connecting pin hole tends to break while the conveyor chain is running. This will cause a downtime of the conveyor chain.

SUMMARY OF THE INVENTION

It is accordingly an object of this invention to provide a molded conveyor chain having structural features which enable easy and reliable joining and separation of the conveyor chain to facilitate assembling and disassembling of the conveyor chain which is required at the initial setting on a conveyor frame and which may become necessary for subsequent maintenance of the conveyor chain.

Another object of the present invention is to provide a molded conveyor chain which is capable of smoothly conveying delicate or easy-to-break articles in the electric, electronic, food-processing, or pharmaceutical industry.

In one preferred form of the present invention, a molded conveyor chain includes a number of link plates molded of synthetic resin and pivotally connected together by connecting pins. Each of the link plates has a leading end edge, a trailing end edge opposite to the leading end edge, a plurality of aligned bush holes formed at intervals along the trailing end edge, and a plurality of aligned pin holes formed at intervals along the leading end edge. The connecting pin is inserted alternately into the pin holes in one of the link plates and the bush holes in the adjacent link plate to pivotally connect said one link plate and the adjacent link plate. Each of the connecting pins has a radial locking projection to prevent the connecting pin from displacing off said one link plate and the adjacent link plate. The locking projection is located closer to one end of the connecting pin than to a longitudinal central portion of the connecting pin.

Preferably, each of the connecting pins further has a flange-like stopper formed integrally with an end face of said one end of the connecting pin. The flange-like stopper is engaged with one of opposite sidewalls of said one link plate to position the locking projection such that the locking projection is received inside one of the bush holes in the adjacent link plate. Said one sidewall may have a recess for receiving therein the flange-like stopper of the connecting pin. It is preferable that the flange-like stopper has a beveled inner surface, and the recess has an outer end flared to form a space between a peripheral wall of the recess and the flange-like stopper for accepting insertion of a tip end of a screwdriver into the recess such that the tip end of the screwdriver is received in a space defined between a bottom surface of the recess and the beveled inner surface of the flange-like stopper.

The connecting pins have a non-circular cross section, such as a D shape. The pin holes has a cross section complementary to the cross section of the connecting pins. Thus, the connecting pins cannot rotate relative to the pin holes. The D-shaped pin holes are arranged with flat surface portions of the respective peripheral walls facing forward of the conveyor chain.

The bush holes are circular holes having an inside diameter slightly greater than the outside diameter of the connecting pins. The connecting pin slidably received in the bush holes allow the adjacent link plates to pivot or turn relative to each other about the axis of the connecting pin.

The locking projection is formed on a flat surface portion of the D-shaped connecting pin. The maximum height of the locking projection is determined such that the projection is located inside a circular cylinder drawn by a circumferential surface of the connecting pin. Thus, the connecting pin can be inserted into and removed from the two adjacent link plates without damaging peripheral walls of the bush holes.

In another preferred form of the invention, a molded conveyor chain includes a number of link plates molded of synthetic resin and pivotally connected together by connecting pins. Each of the link plates has a leading end edge, a trailing end edge opposite to the leading end edge, a single bush hole formed along the trailing end edge, and two aligned, axially spaced pin holes formed along the leading end edge. Each of the connecting pins is inserted alternately into the pin holes in one of the link plates and the bush hole in the adjacent link plate to pivotally connect said one link plate and the adjacent link plate. The connecting pin has a radial locking projection to prevent the connecting pin from displacing off said one link plate and the adjacent link plate. The locking projection is located closer to one end of the connecting pin than to a longitudinal central portion of the connecting pin. The connecting pin further has a flange-like stopper formed integrally with an end face of said one end of the connecting pin. The flange-like stopper is engaged with one of opposite sidewalls of said one link plate to position the locking projection such that the locking projection is received inside the bush hole in the adjacent link plate.

The above and other objects, features and advantages of the present invention will become apparent to those versed in the art upon making reference to the following description and accompanying sheets of drawings in which certain preferred structural embodiments of the present inventions are described by way of illustrative examples.

DETAILED DESCRIPTION OF THE PREFERRED EMBODIMENTS

Certain preferred structural embodiments of the present invention will be described in greater detail with reference to the accompanying drawings wherein like or corresponding parts are designated by the same reference characters throughout the several views.

FIGS. 1 through 9 show a molded conveyor chain according to a first embodiment of the present invention. A shown in FIG. 8, the molded conveyor chain includes a number of link plates 10 (two being shown) pivotally connected together by connecting pins 20 (one being shown). The link plates 10 and the pins 20 are both molded of synthetic resin, such as polyamide, polybutylene terephthalate, polyacetal, polypropylene, polyethylene or the like engineering plastic. The pin 20 may be formed from an antiseptic metal, such as stainless steel. However, when considering the chain weight and the sanitary working environment, the plastic connecting pins appear to be preferable to the metallic connecting pins. The link plates 10 connected together by the connecting pins 10 form a continuous flexible plate on which articles are carried while the conveyor chain is running.

As shown in FIGS. 1 and 3–6, the molded link plates 10 each have a plurality (five in the illustrated embodiment) of aligned bush holes 11 formed at intervals along a trailing end edge thereof, and a plurality. (six in the illustrated embodiment) of aligned pin holes 12 formed at intervals along a trailing end edge thereof. The bush holes 11 and the pin holes 12 are arranged in a zigzag or staggered relation to each other.

Figure 1:
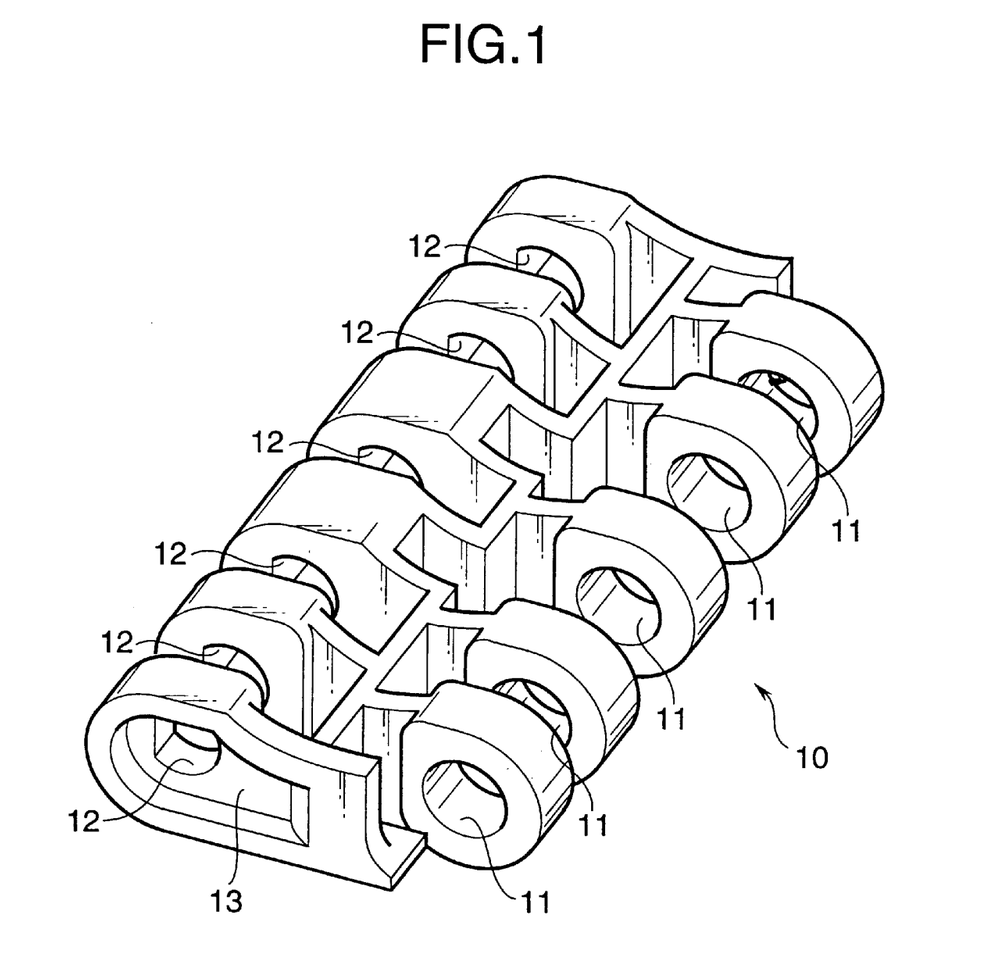
FIG. 1 is a perspective view of a link plate, when viewed from the below, of a conveyor chain according to first embodiment of the present invention.
Figure 2:
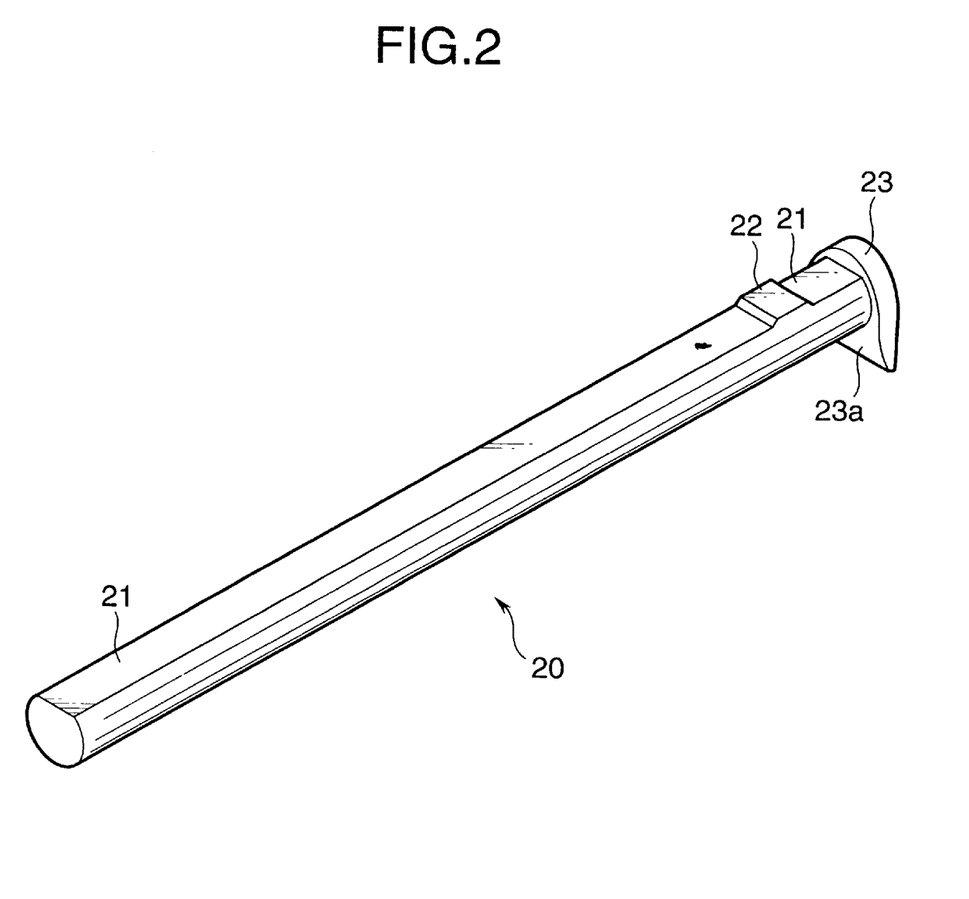
FIG. 2 is a connecting pin used in combination with the link plate shown in FIG. 1.
Figure 3:
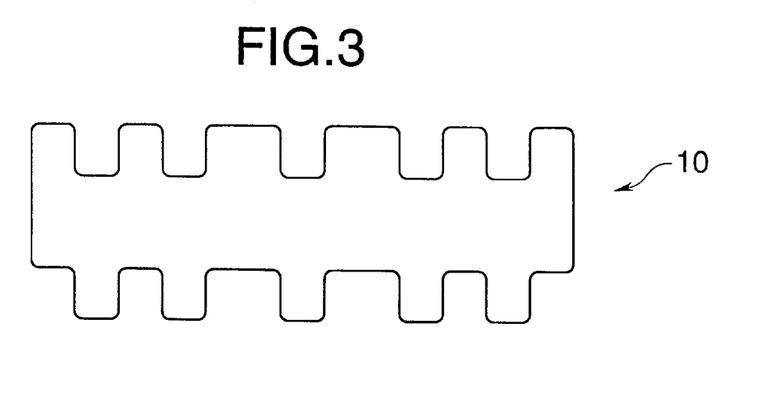
FIG. 3 is a plan view of the link plate.
Figure 4:
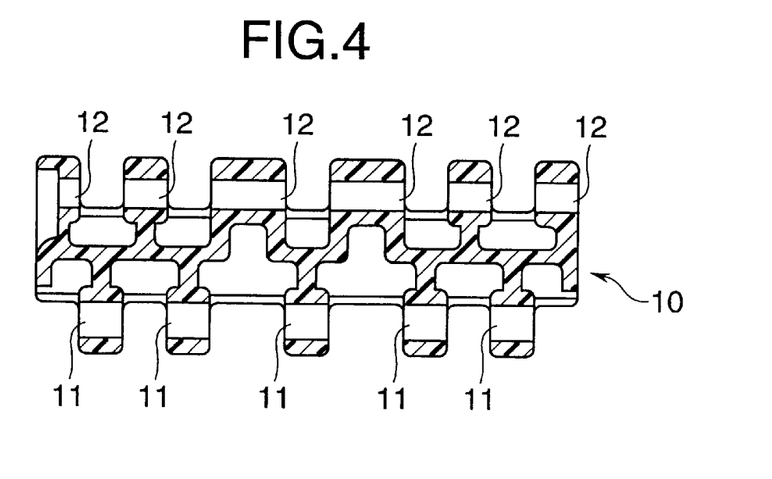
FIG. 4 is a longitudinal cross-sectional view FIG. 3.
Figure 5:
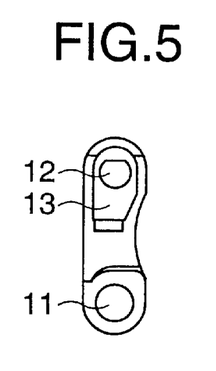
FIG. 5 is a left side end view of FIG. 3.
Figure 6:
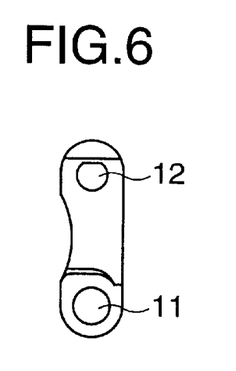
FIG. 6 is a right side end view of FIG. 3.

The bush holes 11 are circular holes having an inside diameter slightly larger than the outside diameter of the connecting pin 20 (FIG. 2). The bush holes 11 and the connecting pin 20 slidably received therein ensure that the link plates 10 can smoothly pivot or turn relative to each other about the axis of the pin 20. The pin holes 12 have a non-circular cross section, such as a D shape as in the illustrated embodiment. The D-shaped pin holes 12 are arranged with flat surface portions of the respective peripheral walls facing forward of the conveyor chain.

Figures 8, 8A:
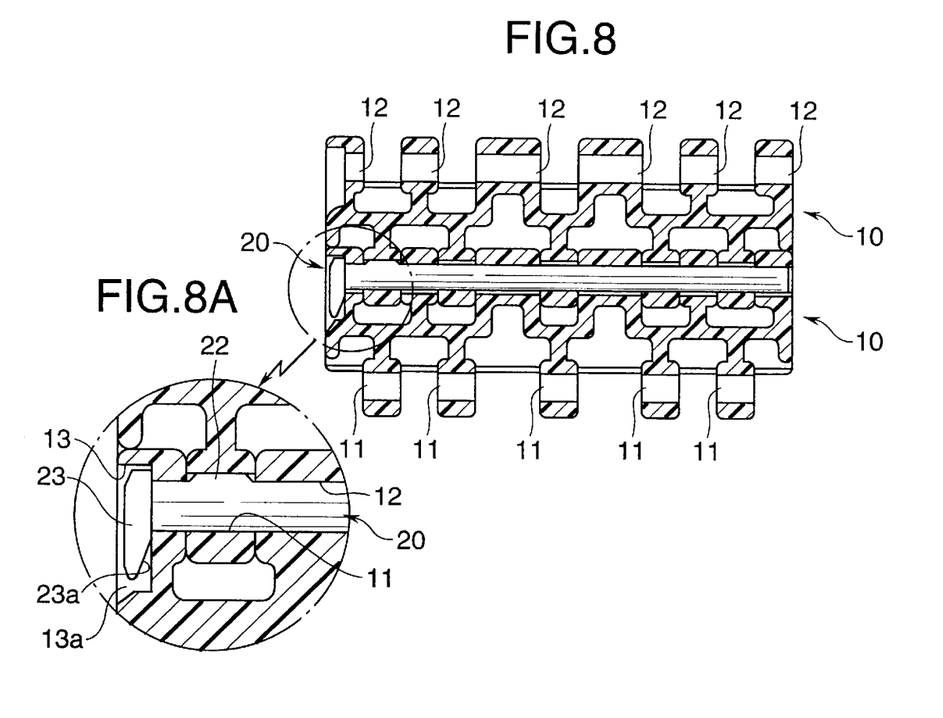
FIG. 8 is a cross-sectional view showing the manner in which the connecting pin is fully inserted in the two link plates.
FIG. 8A is an enlarged view of a portion of FIG. 8.

As shown in FIG. 2, each of the connecting pins 20 has a generally D-shaped cross section which is complementary in contour to the D-shaped cross section of the pin holes 12. The D-shaped connecting pin has a flat surface 21 extending longitudinally throughout the length of the connecting pin 20. The connecting pin 20, when received in the pin holes 12, is not rotatable relative to the pin holes 12. The connecting pin 20 further has a locking projection 22 formed on the flat surface 21 to prevent the connecting pin 20 from displacing off the link plates 10. The locking projection 22 is located closer to one end of the connecting pin 20 than to a longitudinal central portion of the connecting pin 20. In the illustrated embodiment, the locking projection 22 is located near one end (right end in FIG. 2) of the connecting pin 20. The locking projection 22 projects from the flat surface 21 to such an extent that the locking projection 22 is located inside a circular cylinder drawn by a circumferential wall of the connecting pin 20. With the locking projection 22 thus arranged, the connecting pin 20 can be inserted in, or removed from, the bush holes 11 and the pin holes 12 without damaging the respective peripheral walls of the holes 11, 12. The connecting pin 20 further has a flange-like stopper 23 formed integrally with an end face at one end of the connecting pin 20. The locking projection 22 is positioned relative to the flange-like 5topper 23 such that when the connecting pin 20 is inserted alternatively in the pin holes 12 and the bush holes 11 to pivotally connect two adjacent link plates 10, the locking projection 22 is received inside one pin hole 11 located between two adjacent pin holes 12, with the flange-like stopper 23 held in abutment with one sidewall of one link plate 10, as shown in FIGS. 8 and 8A. The flange-like stopper 23 has a beveled inner surface 23a for a purpose described below.

The sidewall of the link plate 10 has a recess 13 for receiving therein the flange-like stopper 23. The recess 13 has a depth slightly larger than the thickness of the flanges-like stopper 23. Accordingly, when manual driving of the connecting pin 20 into the pin holes 12 and the bush holes 11 is insufficient, the flange-like stopper 23 tends to project from the recess 13 or to lie flush with the sidewall of the link plate 10. Thus, the operator can determine the position of the connecting pin 20 through the sense of touch or visual inspection. As shown in FIG. 8A, the recess 13 has an outer end partly flared to form a space 13a between the flange-like stopper 23 and a peripheral wall of the recess 13. When the connecting pin 20 is to be removed, the space 13a accommodates insertion of a tip end of a tool, such as a screwdriver T, into the recess 13 to such an extent that the tool tip end is located between the beveled inner surface 23a of the flange like stopper 23 and a bottom surface of the recess 13, as shown in FIG. 8B. The tool T is then turned about the flared outer end of the recess 13 in the direction of the arrow A shown in FIG. 8A, the flange-like stopper 23 is pulled out from the recess 13 as indicated by the arrow B shown in FIG. 8A. The connecting pin 20 can now be withdrawn or removed by hand from the link plates 10 (one being shown).

Figure 7:
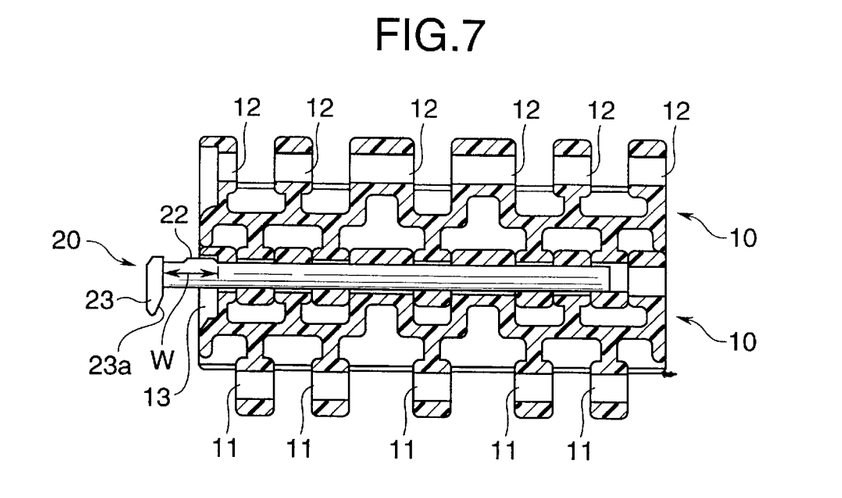
FIG. 7 is a cross-sectional view showing the manner in which the connecting pin is partly inserted in two adjacent link plates.

When the conveyor chain is set on a conveyor frame (not shown), two link plates 10 located at opposite ends of the conveyor chain are connected together by a connecting pin 20. In this instance, the trailing end edge of one link plate 10 and the leading end edge of the other link plate 10 are held in interdigitating condition so that the bush holes 11 at the trailing edge and the pin holes 12 at the leading end edge are aligned with each other. While keeping this condition, the connecting pin 20 is inserted by hand into the thus aligned pin holes 12 and bush holes 11 until the locking projection 22 abuts against one sidewall of the link plate 10, as shown in FIG. 7. Then, the flange-like stopper 23 of the connecting pin 20 is hammered to drive the connecting pin 20 toward the other sidewall of the link plate 10 until the flange-like stopper 23 is fully recieved in the recess 13, as shown in FIG. 8 and 8A. In this instance, the locking projection 22 is fully received within one bush hole 11, as shown in FIG. 8A.

Since the bush hole 11 is a circular hole having an inside diameter slightly larger than the outside diameter of the connecting pin 20, and since the locking projection 22 does not project beyond a circular cylinder drawn by the circumferential surface of the connecting pin 20, the locking projection 22 fully received inside the bush hole 11 does not impart any damage on the peripheral wall of the bush hole 11. Additionally, because a stroke W (FIG. 7) of hammering required to drive the connecting pin 20 into the holes 11, 12 is very small (as compared to the distance z required for the conventional connecting pin 50 shown in FIG. 12), the linklate connecting work can be readily achieved with high reliability by a single operator.

When the connecting pin 20 is to be removed to disassemble the conveyor chain for maintenance, a punch (not shown) having a smaller diameter than the connecting pin 20 is used to strike an end of the connecting pin 20 which is opposite from the flange-like stopper 23. By hammering the punch, the connecting pin 20 is forced out from the holes 11, 12. As an alternative, a tool such as a screwdriver T (FIG. 9) may be used. As described previously, a tip end of the screwdriver T is inserted into the recess 13 through the space 13a until it reaches a space between the bottom surface of the recess 13 and the beveled inner surface 23a of the flange-like stopper 23 of the connecting pin 20. By turning the screwdriver T about the flared outer end of the recess 13 in the direction of the arrow A in FIG. 9, the flange-like stopper 23 is forced out from the recess 13, enabling the connecting pin 20 to be withdrawn or removed from the link plates 10.

Figure 10:
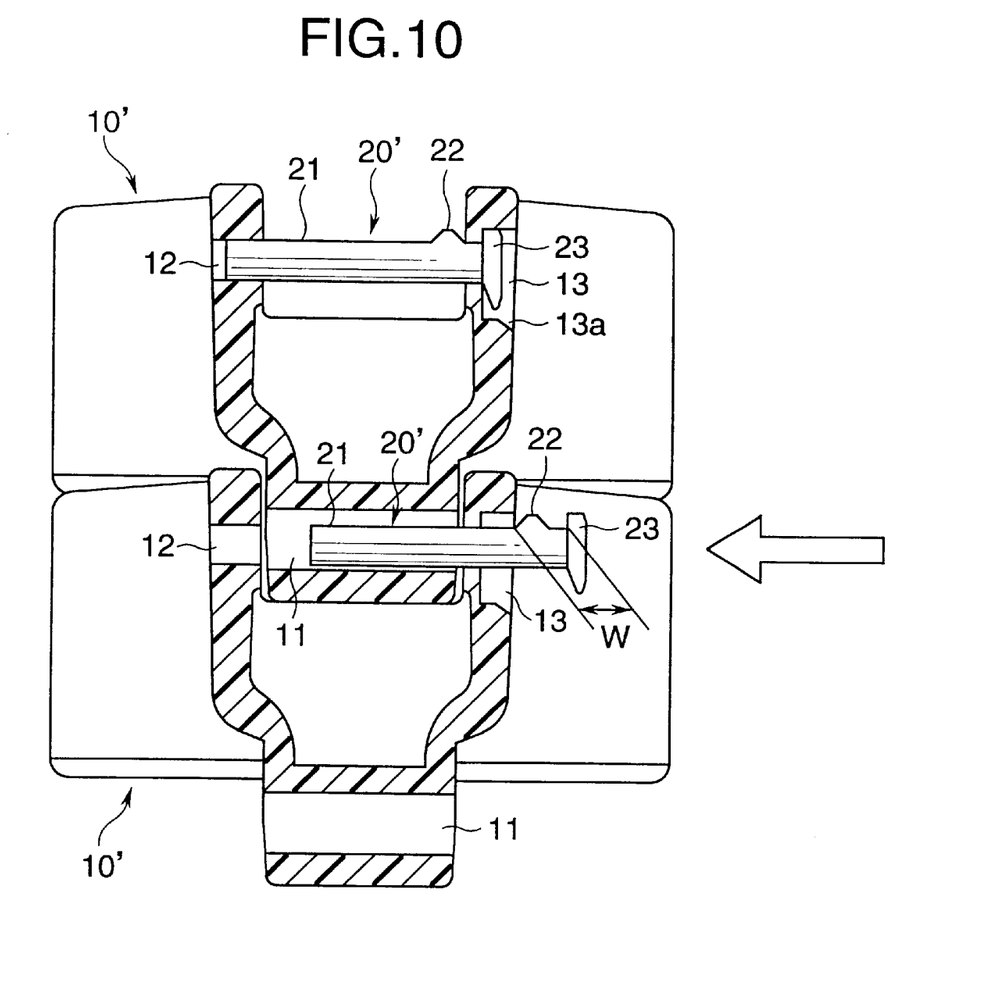
FIG. 10 is a cross-sectional view showing two adjacent link plates about to be connected together by a connecting pin according to another embodiment of the present invention.

FIG. 10 shows a part of a molded conveyor chain according to a second embodiment of the present invention.

The conveyor chain includes a number of link plates 10' (two being shown) pivotally connected together by connecting pins 20' (two being shown). The link plates 10' connected together by the connecting pins 20' form a continuous flexible plate on which articles are carried while the conveyor chain is running. The link plates 10' are molded of synthetic resin. Eligible synthetic resin materials for the link plates 10' are the same as those used in molding the link plates 10 of the foregoing embodiment shown in FIGS. 1–9.

The molded link plates 10' each have a bush hole 11 formed along a trailing end edge at a barrel end of the link plate 10', and two aligned pin holes 12 formed along a trailing end edge at an open end of the link plate 10'. The barrel end of one link plate 10' is received in the open end of the adjacent link plate 10' with the bush hole 11 being aligned with the two a lined pin holes 12.

The bush hole 11 is a circular hole having an inside diameter slightly larger than the outside diameter of the connecting pins 20'. The bush hole 11 and the connecting pin 20' received therein insure smooth bending or flexing of the conveyor chain about the axis of each connecting pin 20'. The pin holes 12 have a non-circular cross section, such as a D shape as in the illustrated embodiment. The D-shaped pin holes 12 are arranged with flat surface portions of the respective peripheral walls facing forward of the conveyor chains The connecting pins 20' are molded of synthetic resin and have substantially the same construction a is the connecting pin 20 shown in FIG. 2. Thus, the connecting pins 20' have a generally D-shaped cross section which is complementary in contour to the D-shaped cross section of the pin holes 12. The D-shaped connecting pins 20 each have a flat surface 21 extending longitudinally throughout the length of the connecting pin 20'. The connecting pin 20', when received in the pin holes 12, is not rotatable relative to the pin holes 12. The connecting pin 20 further has a locking projection 22 formed on the flat surface 21 for preventing the connecting pin 20' from displacing off the link plates 10'. The locking projection 22 is located closer to one end of the connecting pin 20' than to a longitudinal central portion of the connecting pin 20'. In the illustrated embodiment, the locking projection 22 is located near one end (right end) of the connecting pin 20'. The maximum height of the locking projection 22 is determined such that the locking projection 22 is located inside a circular, cylinder drawn by a circumferential wall of the connecting pin 20'. The connecting pin 20' having such locking projection 22 can be inserted in, or removed from, the bush hole 11 and the pin holes 12 without damaging the respective peripheral walls of the holes 11, 12.

The connecting pin 20' further has a flange-like stopper 23 formed integrally with an end face the connecting pin 20'.

The locking projection 22 is positioned relative to the flange-like stopper 23 such that when the connecting pin 20' is inserted in the pin holes 12 and the bush hole 11 to join the two link plates 10', the locking projection 22 is received inside the bush hole 11 and preferably is in interlocking engagement with an inner surface of the link plate 10' blending to an inner end oft one pin hole 12 from which the connecting pin 20' is inserted.

Figure 9:
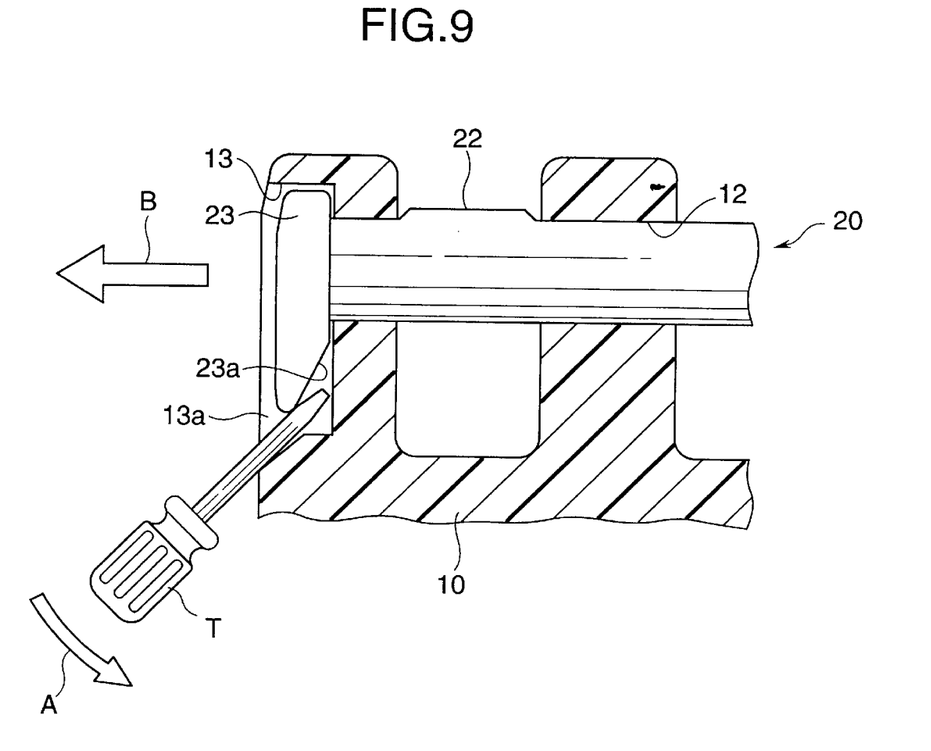
FIG. 9 is a fragmentary cross-sectional view illustrative of the manner in which the connecting pin is about to be removed from the link plates.

A sidewall of the link plate 10' has a recess 13 for receiving therein the flange-like stopper 23. Thus, the recess 13 is connected with the pin hole 12. The recess 13 has a depth slightly larger than the thickness of the flange-like stopper 23 to make sure that when the connecting pin 20' is insufficiently driven into the holes 11, 12, the flange-like stopper 23 tends to project from the recess 13 or lie flush with the sidewall of the link plate 10' the flange-like stopper 23; and such inappropriate position of the flange-like stopper 23 can be easily determined by the operator through the sense of touch or visual inspection. The recess 13 has an outer end partly flared to form a space 13a between a peripheral wall of the recess 13 and the flange-like stopper 23 received in the recess 13. When the connecting pin 20 is to be removed, the space 13a accepts insertion of a tip end of a tool, such as a screwdriver in the same manner as shown in FIG. 9. By turning the screwdriver about the flared outer end of the recess 13, the flange-like stopper 23 is pulled out from the recess 13, enabling the operator to remove the connecting pin 20' from the link plates 10'.

When the conveyor chain is set on a conveyor frame (not shown), two link plates 10', 10' located at opposite ends of the conveyor chain are connected together by a connecting pin 20'. In this instance, the barrel end of the trailing link plate 10' is received in the open end of the leading link plate 10' so that the bush hole 11 in the barrel end is aligned with the pin holes 12 in the open end. While keeping this condition, the connecting pin 20' is inserted by hand into the thus aligned holes 12 and 11 until the locking projection 22 abuts against the recessed sidewall of the link plate 10. Then, the flange-like stopper 23 is hammered from the direction indicated by the arrow shown in FIG. 10, driving the connecting pin 20' toward the opposite sidewall of the link plate 10 until the flange-like stopper 23 is fully received in the recess 13. In this instance, the locking projection 22 is received in the bush hole 11. Since a stroke W of hammering required to drive the connecting pin 20' into the holes 11, 12 is very small (as compared to the distance Z required for the, conventional connecting pin 50 shown in FIG. 12), the link-p:Late connecting work can be readily achieved with high reliably by the action of a single operator.

When the connecting pin 20' is to be removed from the link plates 10' to disassemble the conveyor chain for maintenance, a punch (not shown) having a smaller diameter than the connecting pin 20 is used to strike a flange-free end of the connecting pin 20' to thereby remove the connecting pin 20 from the holes 11, 12. As an alternative, by using a tool such as a screwdriver (not shown but may be the one T shown in FIG. 9), the flange-like stopper 23 of the connecting pin 20' may be forced out from the recess 13 by a tip end of the screwdriver received inside the recess 13.

The molded conveyor chains according to the present invention have various advantages as enumerated below.

(1) Because the locking projection formed on the connecting pin is located closer to one end of the connecting pin than to a longitudinal central portion of the connecting pin, the connecting pin can be easily inserted by hand alternately into pin holes at a leading end of one link plate and bush holes at a trailing end of the adjacent link plate until the locking projection comes into abutment with a sidewall of the one link plate. The connecting pin is then driven by a hammer until the locking projection moves past the endmost pin hole and is received inside the bush hole located next to the endmost pin hole. A stroke of hammering the connecting pin is much smaller than that of the conventional connecting pin. Thus, a chain-link joining work can be achieved with utmost ease, high reliability and considerable reductions in working time.

(2) The flange-like stopper provided on an end of the connecting pin engages the sidewall of the link plate to position the locking projection such that when the connecting pin is in the fully inserted position, the locking projection is received in one of the bush hole. The flange-like stopper prevents excessive hammering of the connecting pin and protects an end of the connecting pin against deformation and damage.

(3) The recess formed in one sidewall of each link plate for receiving therein the flange-like stopper ensures that by checking, with the sense of touch or through visual inspection, a difference in level between the recessed sidewall and flange-like stopper received in the recess, the operator can easily determine as to whether or not the connecting pin is in its predetermined fully inserted position where the locking projection is disposed in the desired position. The recess accommodates insertion of a tip end of a tool, such as a Screwdriver, which is used to pull out the flange-like stopper from the recess when the connecting pin is to be removed to disassemble the conveyor chain.

Obviously, various minor changes and modifications of the present invention are possible in the light of the above teaching. It is to be understood that within the scope of the appended claims the present invention may be practiced otherwise than as specifically described.

What is claimed is:

1. A molded conveyor chain comprising;
   a number of link plates molded of synthetic resin and pivotally connected together by connecting pins;
   each of said link plates having a width corresponding to the width of the conveyor chain, a leading end edge, a trailing end edge opposite to said leading end edge, a plurality of aligned bush holes formed at intervals along said trailing end edge, and a plurality of aligned pin holes formed at intervals along said leading end edge;
   each of said connecting pins extending across the width of the link plates and being inserted alternately into said pin holes in one of said link plates and said bush holes in the adjacent link plate to pivotally connect said one link plate and said adjacent link plate; and
   each of said connecting pins having a single radial locking projection to prevent said connecting pin from displacing off said one link plate and said adjacent link plate, said single locking projection being located closer to one end of said connecting pin than to a longitudinal central portion of said connecting pin.

2. A molded conveyor chain according to claim 1, wherein each of said connecting pins further has a flange-like stopper formed integrally with an end face of said one end of said connecting pin, said flange-like stopper being engaged with one of opposite sidewalls of said one link plate to position said locking projection such that said locking projection is received inside one of said bush holes in said adjacent link plate.

3. A molded conveyor chain according to claim 2, wherein said one sidewall has a recess for receiving therein said flange-like stopper of said connecting pin.

4. A molded conveyor chain according to claim 3, wherein said flange-like stopper has a beveled inner surface, and said recess has an outer end flared to form a apace between a peripheral wall of said recess and said flange-like stopper for accepting insertion of a tip end of a screwdriver into said recess such that the tip end of the screwdriver is received in a space defined between a bottom surface of said recess and said beveled inner surface of said flange-like stopper.

5. A molded conveyor chain comprising:

a number of link plates molded of synthetic resin and pivotally connected together by connecting pins;

each of said link plates having a width corresponding to the width of the conveyor chain, a leading end edge, a trailing end edge opposite to said leading end edge, a single bush hole formed along said trailing end edge, and two aligned, axially spaced pin holes formed along said leading end edge;

each of said connecting pins extending across the width of the link plate and being inserted alternately into said pin holes in one of said link plates and said bush hole in the adjacent link plate to pivotally connect said one link plate and said adjacent link plate;

each of said connecting pins having a single radial locking projection to prevent said connecting pin from displacing off said one link plate and said adjacent link plate, said single locking projection being located closer to one end of said connecting pin than to a longitudinal central portion of said connecting pin; and each of said connecting pins further having a flange-like stopper formed integrally with an end face of said one end of said connecting pin, said flange-like stopper being engaged with one of opposite sidewalls of said one link plate to position said locking projection such that said locking projecting is received inside said bush hole in said adjacent link plate.

6. A molded conveyor chain according to claim 5, wherein said one sidewall has a recess for receiving therein said flange-like stopper of said connecting pin.

7. A molded conveyor chain according to claim 6, wherein said flange-like stopper has a beveled inner surface, and said recess has an outer end flared to form a space between a peripheral wall of said recess and said flange-like stopper for accepting insertion of a tip end of a screwdriver into said recess such that the tip end of the screwdriver is received in a space defined between a bottom surface of said recess and said beveled inner surface of said flange-like stopper.

8. A molded conveyor chain having a given width, comprising:

a number of link plates molded of synthetic resin, and a like number of connecting pins pivotally connecting the link plates together along the length of the conveyor chain;

each of said link plates extending from side to side across the full width of said chain and having a leading end edge, a trailing end edge opposite to said leading end edge, and side walls at opposite sides of the conveyor chain, at least one bush hole formed along said trailing end edge, and two aligned, axially spaced pin holes formed in said opposite side walls of the link plate along said leading end edge;

each of said connecting pins being inserted alternately into said pin holes in one of said link plates and said at least one bush hole in the adjacent link plate to pivotally connect said one link plate and said adjacent link plate, said pin extending from the pinhole at one side of the link plate to the pin hole at the opposite side of the link plate;

each of said connecting pins having a radial locking projection to prevent said connecting pin from displacing off said one link plate and said adjacent link plate, said locking projection being located closer to one end of said connecting pin than to a longitudinal central portion of said connecting pin, and being positioned within said at least one bush hole;

each of said connecting pins further having a flange-like stopper formed integrally with an end face of said one end of said connecting pin, said flange-like stopper being engaged with one of said opposite sidewalls of said one link plate to position said locking projection such that said locking projection is received inside said at least one bush hole in said adjacent link plate.

9. A molded conveyor chain according to claim 8, wherein said one sidewall has a recess surrounding said pin hole for receiving therein said flange-like stopper of said connecting pin, said recess having a depth less than the thickness of said one sidewall, to provide a web with a residual thickness containing said pin hole, said locking projection being spaced from said stopper a distance greater than said residual thickness to enable said projection to be positioned in said at least one bush hole.

10. A molded conveyor chain according to claim 9, wherein said flange-like stopper has a beveled inner surface confronting said web, and said recess has an outer end flared to form a space between a peripheral wall of said recess and said flange-like stopper for accepting insertion of a tip end of screwdriver into said recess such that the tip end of the screwdriver is received in a space defined between said web and said beveled inner surface of said flange-like stopper.

11. A molded conveyor chain according to claim 8, wherein each of said pin holes has a non-cylindrical configuration, and said pin has a complementary non-cylindrical outline conforming to the configuration of the pin holes to anchor said pin against rotation in said pin holes, said at least one bush hole comprising a cylindrical bore having a diameter slightly greater than the diameter of an imaginary cylinder circumscribing said connecting pin and its locking projection.

\* \* \* \* \*

UNITED STATES PATENT AND TRADEMARK OFFICE
CERTIFICATE OF CORRECTION

PATENT NO. : 6,213,292 B1
DATED : April 10, 2001
INVENTOR(S) : Takahashi

It is certified that error appears in the above-identified patent and that said Letters Patent is hereby corrected as shown below:

Column 1,
Line 18, "Tn the assembled Plate" should be -- In the assembled state --;

Column 5,
Line 3, "5topper" should be -- stopper --;
Line 14, "flanges-" should be -- flange --;
Line 63, "linklate" should be -- link-plate --;

Column 6,
Line 44, "a is" should be -- as --;

Column 7,
Line 7, "oft" should be -- of --;
Line 48, "link-p:Late" should be -- link-plate --.

Signed and Sealed this

Twenty-eighth Day of August, 2001

Attest:

NICHOLAS P. GODICI
Attesting Officer
Acting Director of the United States Patent and Trademark Office